(12) United States Patent
McEwan

(10) Patent No.: US 7,446,699 B2
(45) Date of Patent: Nov. 4, 2008

(54) ERROR CORRECTOR FOR RADAR TIMING SYSTEMS

(76) Inventor: Thomas Edward McEwan, 8708 W. Gilmore, Las Vegas, NV (US) 89129

( * ) Notice: Subject to any disclaimer, the term of this patent is extended or adjusted under 35 U.S.C. 154(b) by 117 days.

(21) Appl. No.: 11/373,378

(22) Filed: Mar. 10, 2006

(65) Prior Publication Data
US 2007/0210955 A1   Sep. 13, 2007

(51) Int. Cl.
*G01S 13/00* (2006.01)
*G01S 7/40* (2006.01)

(52) U.S. Cl. .................. 342/199; 342/83; 342/102; 342/174

(58) Field of Classification Search .......... 342/77, 342/98–103, 75, 175, 91–93, 193–195, 199; 331/2, 18, 46, 47
See application file for complete search history.

(56) References Cited

U.S. PATENT DOCUMENTS

| | | | | |
|---|---|---|---|---|
| 3,474,449 A * | 10/1969 | Briggs | ........................ | 342/399 |
| 3,944,925 A | 3/1976 | De Laune | | |
| 4,118,673 A | 10/1978 | Hafner | | |
| 4,132,991 A | 1/1979 | Wocher et al. | | |
| 4,297,701 A | 10/1981 | Henriques | | |
| 4,336,511 A * | 6/1982 | Stromswold et al. | ........ | 331/178 |
| 4,446,425 A | 5/1984 | Valdmanis et al. | | |
| 4,539,565 A * | 9/1985 | Norsworthy | ................. | 342/128 |
| 4,845,685 A * | 7/1989 | Wechsler et al. | ............... | 367/97 |
| 5,001,683 A | 3/1991 | Fukumoto et al. | | |
| 5,298,867 A * | 3/1994 | Mestha | ........................ | 315/500 |
| 5,563,605 A | 10/1996 | McEwan | | |
| 5,646,564 A * | 7/1997 | Erickson et al. | ............. | 327/158 |
| 5,757,320 A * | 5/1998 | McEwan | ..................... | 342/387 |
| 6,055,287 A * | 4/2000 | McEwan | ..................... | 375/376 |
| 6,072,427 A * | 6/2000 | McEwan | ..................... | 342/175 |
| 6,137,438 A * | 10/2000 | McEwan | ..................... | 342/134 |
| 6,191,724 B1 * | 2/2001 | McEwan | ..................... | 342/21 |
| 6,373,428 B1 * | 4/2002 | McEwan | ..................... | 342/175 |
| 6,404,288 B1 | 6/2002 | Bletz et al. | | |
| 6,414,627 B1 * | 7/2002 | McEwan | ..................... | 342/134 |
| 6,452,467 B1 * | 9/2002 | McEwan | ..................... | 333/240 |
| 6,462,705 B1 * | 10/2002 | McEwan | ..................... | 342/175 |
| 6,466,168 B1 * | 10/2002 | McEwan | ..................... | 342/465 |
| 6,535,161 B1 * | 3/2003 | McEwan | ..................... | 342/124 |
| 6,644,114 B1 * | 11/2003 | McEwan | .................. | 73/290 R |
| 6,791,382 B1 * | 9/2004 | Ting et al. | .................... | 327/156 |
| 6,842,139 B1 * | 1/2005 | Nilsson | ....................... | 342/124 |
| 6,891,440 B2 * | 5/2005 | Straub et al. | ................. | 331/1 R |
| 6,937,107 B2 * | 8/2005 | Ravi et al. | ..................... | 331/47 |
| 7,155,190 B2 * | 12/2006 | Rathbun, Jr. | ................ | 455/260 |
| 7,194,056 B2 * | 3/2007 | Kim et al. | ..................... | 375/371 |
| 2002/0181640 A1 * | 12/2002 | Asakawa et al. | ............ | 375/376 |
| 2007/0064850 A1 * | 3/2007 | Tamura | ....................... | 375/355 |

* cited by examiner

*Primary Examiner*—Thomas H Tarcza
*Assistant Examiner*—Matthew M Barker

(57) ABSTRACT

A feedback loop corrects timing errors by reducing deviations from a constant radar sweep rate. Errors are detected and fed back to a phase corrector in a high gain feedback system. A precision radar rangefinder can be implemented with a direct digital synthesizer (DDS) that includes feedback error correction for reducing range errors by, for example, 100 times, or to 0.1 mm. An error-corrected DDS swept timing system can enable a new generation of highly flexible, repeatable and accurate radar, laser and guided wave rangefinders.

9 Claims, 6 Drawing Sheets

ERROR CORRECTOR FOR RADAR TIMING SYSTEMS

BACKGROUND OF THE INVENTION

1. Field of the Invention

The present invention relates to radar timing circuits and more particularly to precision swept delay circuits for expanded time ranging systems. It can be used to correct errors in a swept-delay clock for sampling radar, Time Domain Reflectometry (TDR) and laser systems.

2. Description of Related Art

High accuracy pulse-echo ranging systems, such as wideband and ultra-wideband pulsed radar, pulsed laser rangefinders, and time domain reflectometers, sweep a timing circuit across a range of delays. The timing circuit controls a receiver sampling gate such that when an echo signal coincides with the temporal location of the sampling gate, a sampled echo signal is obtained. The echo range is then determined from the timing circuit, so high accuracy timing is essential. A stroboscopic time expansion technique is employed, whereby the receiver sampling rate is set to a slightly lower rate than the transmit pulse rate to create a stroboscopic time expansion effect that expands the apparent output time by a large factor, such as 100,000. Expanded time allows vastly more accurate signal processing than possible with realtime systems.

A common approach to generate accurate swept timing employs two oscillators with frequencies $F_T$ and $F_R$ that are offset by a small amount $F_T-F_R=\Delta$. In a ranging application, a transmit clock at frequency $F_T$ triggers transmit pulses, and a receive clock at frequency $F_R$ gates the echo pulses. If the receive clock is lower in frequency than the transmit clock by a small amount $\Delta$, the phase of the receive clock will slip smoothly and linearly relative to the transmit clock such that one full cycle is slipped every $1/\Delta$ seconds. Such a clock system forms a swept phase clock system. The term phase can also relate to time, since phase is another way to express time difference between the two clocks. Typical parameters are: transmit clock $F_T=2$ MHz, receive clock $F_R=1.99999$ MHz, frequency offset $\Delta=10$ Hz, phase slip period=$1/\Delta=100$ milliseconds, and a time expansion factor of $F_T/\Delta=200,000$. This two-oscillator technique was used in the 1960's in precision time-interval counters with sub-nanosecond resolution, and it appeared in a short-range radar in U.S. Pat. No. 4,132,991, "Method and Apparatus Utilizing Time-Expanded Pulse Sequences for Distance Measurement in a Radar," by Wocher et al.

There are many influences that can affect the accuracy of the phase slip, including: (1) oscillator noise due to thermal and flicker effects, (2) transmit-to-receive clock cross-talk, and (3) thermal transients that typically do not track out between the two oscillators. The receive oscillator is typically locked to the offset frequency by a phase locked loop (PLL) circuit, which does a reasonable job when the offset frequency is above several hundred Hertz. Unfortunately, precision long range systems require extremely high accuracy, on the order of picoseconds, at offset frequencies on the order of 10 Hz. A PLL system cannot meet this requirement for the simple reason that the PLL loop response must be slower than $1/\Delta$, or typically slower than 100 ms, which is far too slow to control short term phase errors between the two clocks.

U.S. Pat. No. 6,404,288 to Bletz et al addresses the problems associated with controlling low offset frequencies by introducing three additional oscillators into a system further comprised of seven counters and two phase comparators, all to permit PLL control at higher offset frequencies than the final output offset frequency, which is obtained by frequency down-mixing. This system is too complex for many commercial applications and like the prior art, it does not control instantaneous voltage controlled oscillator (VCO) phase errors and crosstalk.

Swept timing can also be implemented using analog sweep techniques. Analog approaches to swept timing include: (1) an analog voltage ramp that drives a comparator, with the comparator reference voltage controlling the delay, or (2) a delay locked loop (DLL), wherein the delay, or phase, between transmit and receive clocks is measured and controlled with a feedback loop. Examples of DLL architectures are disclosed in U.S. Pat. No. 5,563,605, "Precision Digital Pulse Phase Generator" by the present inventor, Thomas Edward McEwan, and in U.S. Pat. No. 6,055,287 "Phase-Comparator-Less Delay Locked Loop", also by the present inventor. The analog approaches are subject to component and temperature variations, and often require calibration during manufacture. There can also be accuracy limitations.

A radar timing system employing a direct digital synthesizer (DDS) is disclosed in U.S. patent application Ser. No. 11/351,924, "Direct Digital Synthesis Radar Timing System" by the present inventor. A DDS generates frequencies by digitally accumulating phase in a manner that directly emulates the definition of frequency. Frequency $\omega$ can be defined by a rate of change in phase $\phi$ or $\omega=\phi/t$, where t is time. Direct digital synthesis emulates this process by continually incrementing a digital phase value in discrete phase increments in a phase accumulator. It performs the accumulation in discrete time steps. The size of the discrete phase increment is set by a digital tuning word, and the discrete time steps are set by a DDS clock. Together, both define the synthesized frequency. This technique works well for low synthesized frequencies relative to the DDS clock frequency since a large number of small phase increments can be added in the phase accumulator to produce one full cycle spanning 0 to $2\pi$ in phase, and a very smooth progression in phase can be realized. It does not work as well at higher frequencies that are required for radar.

In a radar system, a DDS drives a receive sampling gate at a frequency that is offset from a transmit pulse frequency to produce an expanded time sampled echo signal. The frequency offset generates a smoothly slipping phase between realtime received echoes and the sampling gate that stroboscopically expands the apparent time of the sampled echoes with an exemplary factor of 1-million and a range accuracy of 1-centimeter. The flexibility and repeatability of the digitally synthesized timing system is a quantum leap over analog prior art. However, the accuracy of currently available DDS chips is limited to about 0.05% of full scale range. Many applications require higher accuracy but cannot take advantage of the benefits of a DDS timing system due to limited accuracy.

A rate locked loop (RLL) timing system is disclosed in U.S. patent application Ser. No. 11/343,049, "Rate Locked Loop Radar Timing System" by the present inventor. An RLL regulates phase slip between two clock signals to provide precision timing for radar, TDR and laser ranging systems. A phase detector converts clock phase to voltage and the voltage is differentiated to provide a rate-of-change signal to a loop controller that precisely regulates the rate-of-phase change. The RLL controls a VCO to produce a constant, linear phase slip having phase errors below the time equivalent of 1-picosecond. However, the RLL lacks the repeatability and programmability of a digital timing system such as a DDS.

SUMMARY OF THE INVENTION

The present invention overcomes the limitations of the various analog and digital timing techniques used to generate a swept phase clock by employing an error correction feedback loop that reduces deviations from a constant sweep rate. Errors, i.e., deviations are detected and fed back to a phase corrector in a high gain feedback system.

A radar timing system having a constant sweep rate can be implemented with a direct digital synthesizer (DDS) that generates a receive clock that is offset from a transmit clock However, DDS timing errors can introduce 1 cm range error. A feedback error correction loop can reduce errors to less than 0.1 mm. The flexibility, repeatability and accuracy of an error-corrected DDS timing system can enable a new generation of highly accurate radar, laser and guided wave rangefinders.

The present invention provides an error-corrected swept phase timing system for expanded time radar that can include:
- a clock generator for providing a first clock signal and a swept phase signal,
- a phase corrector including a control port for producing a second clock signal in response to the swept phase signal,
- a phase detector for producing a phase detector output proportional to the phase between the first and second clock signals,
- an error detector for producing an error signal proportional to phase errors between the transmit clock signal and the swept phase signal; and
- a controller coupled to the control port for producing a control signal proportional to the error signal, wherein the first and second clock signals provide error corrected radar timing.

The error detector can comprise a first differentiator for producing a first derivative signal from the phase signal and a second differentiator for producing an error signal from the first derivative signal. It can also comprise a reference ramp generator for producing a reference ramp signal and a differencing element for producing an error signal proportional to the difference between the reference ramp signal and the phase signal.

The clock generator can include a reference oscillator to provide the first clock signal and a voltage controlled oscillator (VCO) to provide the swept phase signal. It can also include a reference oscillator to provide the first clock signal and a phase sweep circuit responsive to a range ramp to provide the swept phase signal. It can further include reference oscillator and a digital counter to provide the first clock signal and a direct digital synthesizer (DDS) provide the swept phase signal. The phase detector can consist of a flip-flop and a lowpass filter, the second differentiator can consist of an AC coupling circuit and the second clock signal can be harmonically related to the first clock signal.

The present invention can be used in expanded time radar, laser, and TDR ranging systems having high stability, flexible programmability, excellent repeatability and manufacturability, and an uncorrected phase accuracy on the order of 0.004 degrees using, for example, currently available, low cost DDS chips. Applications include pulse echo rangefinders for tank level measurement, environmental monitoring, industrial and robotic controls, digital handwriting capture, imaging radars, vehicle backup and collision warning radars, and universal object/obstacle detection and ranging.

A beneficial embodiment of the present invention is to provide a precision radar timing system that generates a highly accurate and repeatable phase slip to produce accurate radar signal time expansions and corresponding ranging accuracies. A further beneficial embodiment is to provide precision radar timing that is digitally and rapidly programmable. An even further beneficial embodiment of the present invention is to provide precision radar timing system that is highly reproducible, inherently calibrated and highly accurate.

DETAILED DESCRIPTION OF THE INVENTION

Figure 1:
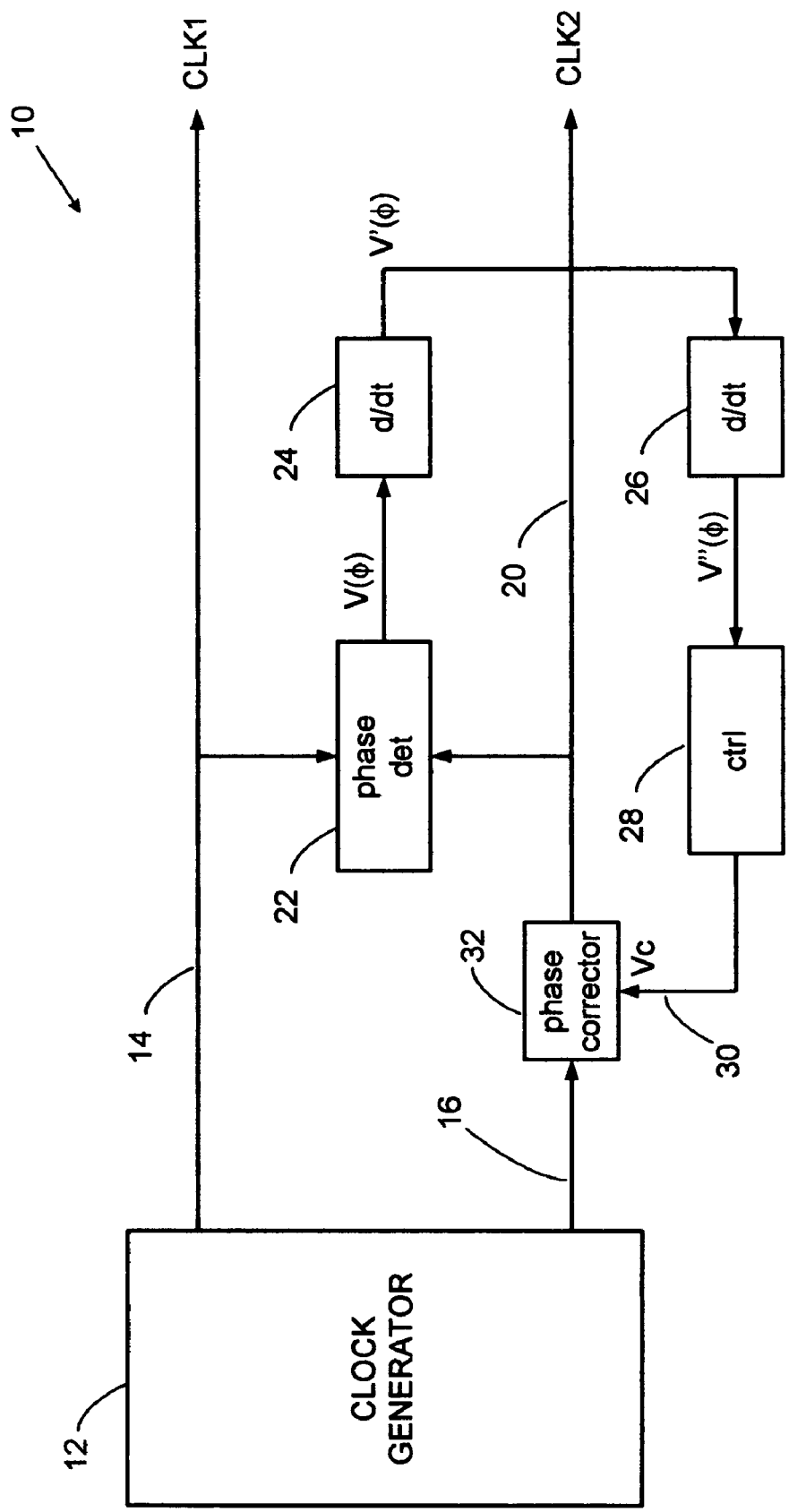
FIG. 1 is a diagram of an error-corrected swept phase timing system of the present invention.

A detailed description of the present invention is provided below with reference to the figures. While illustrative component values and circuit parameters are given, other embodiments can be constructed with other component values and circuit parameters. All U.S. patents and copending U.S. applications cited herein are herein incorporated by reference.

General Description

The present invention overcomes the accuracy limitations of a DDS based clock generator and other clock generators by correcting errors in phase slip on a continuous and instantaneous basis. A beneficial example embodiment, as disclosed herein, employs a phase detector coupled directly between radar transmit and receive clocks, rather than through counter chains that are customary in PLL circuits, to produce a voltage proportional to instantaneous phase. When the phase between the clocks slips at a constant rate, because of the frequency offset between them, the phase detector output is a linear voltage ramp that increases with increasing phase values between 0 and 2 $\pi$ and then it resets to 0 at 2 $\pi$, i.e., at the phase wrap point. The voltage ramp repeats at the offset frequency $\Delta$. The voltage ramp is differentiated by a derivative circuit to produce a constant voltage proportional to the slope of the ramp, which can be termed the derivative voltage. The derivative voltage is applied to another derivative circuit that strips away the constant voltage produced by the first derivative circuit and allows only deviations in voltage from the first derivative circuit to pass as an error signal. A feedback controller controls a phase corrector in response to the error signal with the effect that phase errors are reduced, i.e., corrected. The amount of correction is a function of loop gain. If the slip rate varies, i.e., deviates, the high gain feedback controller instantaneously corrects the deviations.

The second derivative circuit outputs deviations in the rate of phase change. For a perfectly linear phase sweep, the second derivative circuit produces a zero error signal. The rate of sweep sets the output level from the first derivative circuit. The second derivative circuit rejects this output level so the system is not directly influenced by the sweep rate itself. The system is responsive to deviations in rate of change in phase and not to phase itself or to rate of change in phase. Consequently, the overall loop functions as an error corrector. High accuracy swept timing can be realized with low accuracy sweep systems when they are combined with the error corrector. Error correctors can be cascaded for increased error reduction.

One example swept timing system is based on a DDS as discussed in the Related Art section. The accuracy of a DDS timing system is limited by residual phase errors related to the number of accumulator bits in the DDS, which can be fairly large, e.g., 34 bits, and by sine ROM and DAC bit width, which can be 10-14 bits. The least significant bits (LSBs) from the accumulator are truncated to match the bit width of the DAC. A DDS in combination with a sine ROM, a DAC, and a reconstruction filter can provide an offset clock frequency having sufficiently small phase increments for sampling type stroboscopic radars having a full scale range error of 0.05%. When combined with the error corrector of the present invention, accuracy can be reduced to less than 0.001%.

Specific Description

Turning now to the drawings, FIG. 1 illustrates an exemplary configuration of an error-corrected swept phase timing system 10 for expanded time radar of the present invention. A clock generator 12 provides a clock signal (CLK1) on line 14 and a swept phase signal on line 16. The swept phase signal is coupled to a phase corrector 32 that outputs a second clock signal (CLK2) on line 20. CLK1 can be a transmit clock and CLK2 can be a receive clock. The receive dock in a radar can be swept, but the transmit clock can be swept instead.

A phase detector 22 compares the phase between CLK1 and CLK2 and outputs a voltage $V(\phi)$ that is proportional to the CLK1-CLK2 phase. Voltage $V(\phi)$ can have a ramp waveform, termed a phase ramp, when the CLK1-CLK2 phase changes at a constant rate.

A first differentiator 24 differentiates $V(\phi)$ to produce a derivative voltage $V'(\phi)$ proportional to the rate-of-change in phase between CLK1 and CLK2. Voltage $V'(\phi)$ is constant when $V(\phi)$ changes at a linear rate, representing a constant phase slip. A second differentiator 26 differentiates voltage $V'(\phi)$ to produce a second derivative voltage $V''(\phi)$. Voltage $V''(\phi)$ is an error signal representing deviations from a constant phase sweep rate. Controller 28 amplifies $V''(\phi)$ and produces a control voltage Vc proportional to $V''(\phi)$. Voltage Vc is applied as a negative feedback signal to a phase control port of phase corrector 32, which controls the phase of CLK2 relative to its input on line 16.

Blocks 22, 24, 26, and 28, as shown in FIG. 1, form a high gain, high bandwidth continuous-mode feedback loop. Since the loop contains phase detector 22 and derivative elements 24 and 26, it controls a second derivative of phase, or deviations in rate-of-change in phase. Accordingly, the feedback loop controls, i.e., corrects, phase deviations from a constant sweep.

Figure 2A:
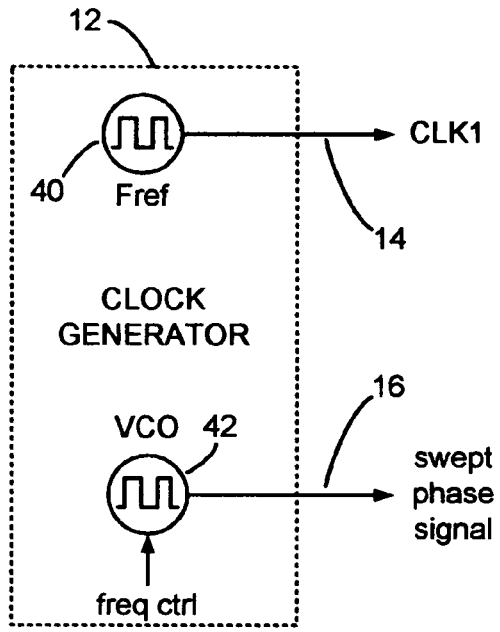
FIG. 2a is a diagram of a two oscillator dock generator.

FIG. 2a depicts an exemplary clock generator 12 having an independent reference oscillator 40, which can be a quartz crystal oscillator that may be temperature compensated (TCXO) or ovenized for greater stability. Oscillator 40 operates at a frequency of Fref. VCO 42 produces a frequency that is offset frequency from Fref. The frequency offset causes the phase of oscillator 42 to slip relative to the phase of oscillator 40, thereby producing a swept phase signal. A frequency control input adjusts the VCO frequency using a PLL or other control system. VCO 42 can be a quartz crystal oscillator with a varactor phase/frequency control element.

Figure 2B:
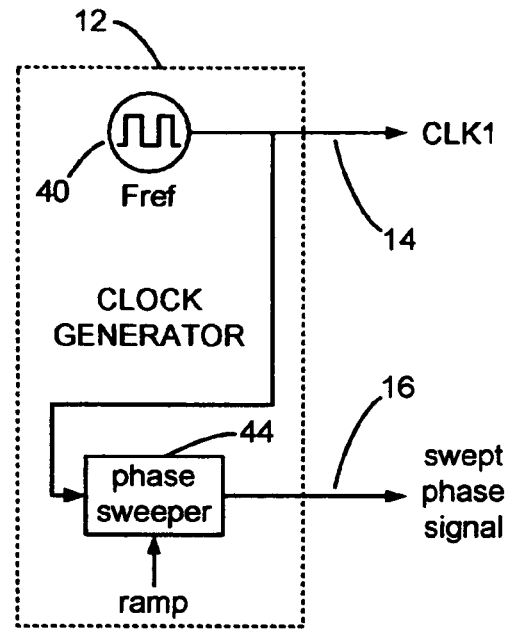
FIG. 2b is a diagram of a single oscillator clock generator including a phase sweeper.

FIG. 2b depicts another exemplary dock generator 12 based on a single oscillator 40, which directly provides CLK1. The swept phase signal is provided by a phase sweeper 44, which is coupled to the CLK1 line. The phase sweeper sweeps its output phase on line 16 in response to a ramp voltage. The maximum phase sweep range is normally limited to less than ½ π, which is sufficient for radar.

Figure 2C:
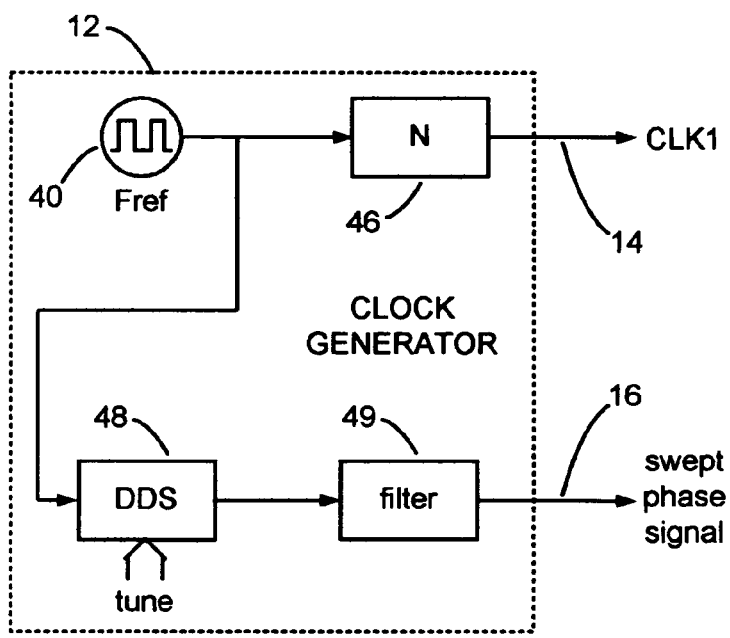
FIG. 2c is a diagram of a DDS based clock generator.

FIG. 2c depicts another exemplary clock generator 12 based on a single oscillator 40, which provides CLK1 on line 14 after division by N using counter 46, where N can be an integer or an integer ratio. A DDS 48 is docked by oscillator 40. The DDS produces an output frequency that is set by a digital tuning word. The tuning word can be set to cause the DDS to output a frequency that is offset from a sub-multiple of Fref. Filter 49 removes spurious frequency components from the DDS output and provides the swept phase signal on line 16. Exemplary parameters for the CLK1 frequency can be 2.000000 MHz and the swept phase signal frequency can be 1.999990 MHz. The difference frequency is 10 Hz and the swept phase signal slips at a smooth rate repeating at a 10 Hz rate. Once every 1/10 second, the phase of the CLK1 and the swept phase signals align so there is zero phase between them for an instant.

Figure 3A:
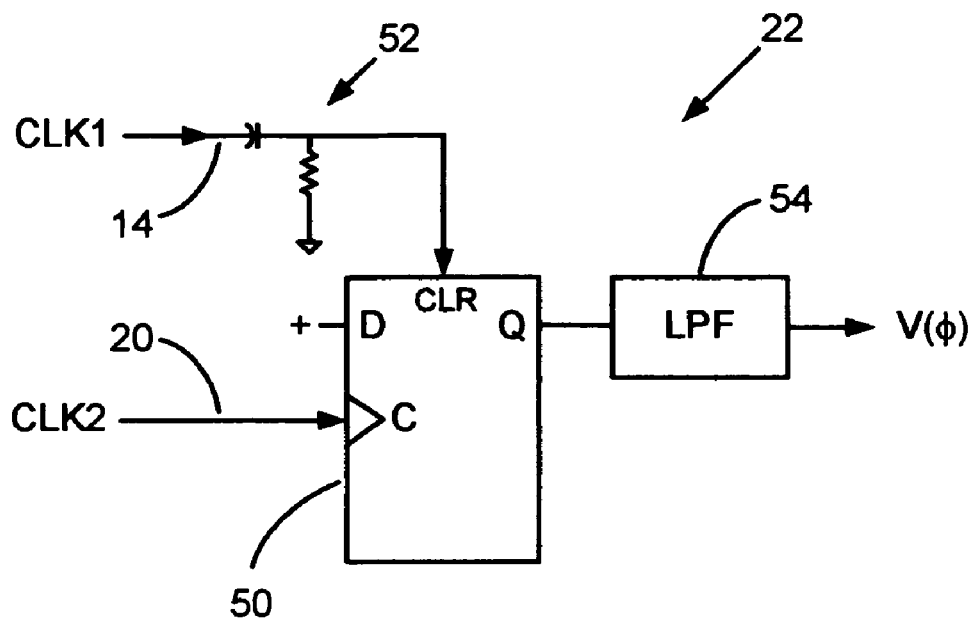
FIG. 3a is a diagram of a phase detector.

FIG. 3a is an exemplary phase detector 22, as shown in FIG. 1, that is based on a D-input latch (or flip-flop) 50. Latch 50 is cleared by CLK1 via edge coupling network 52. After clearing, the next CLK2 edge sets latch 50 so that the duty cycle of the Q output is proportional to the phase between CLK1 and CLK2. Low pass filter 54 averages the duty cycle into a voltage $V(\phi)$ proportional to phase.

Figure 3B:
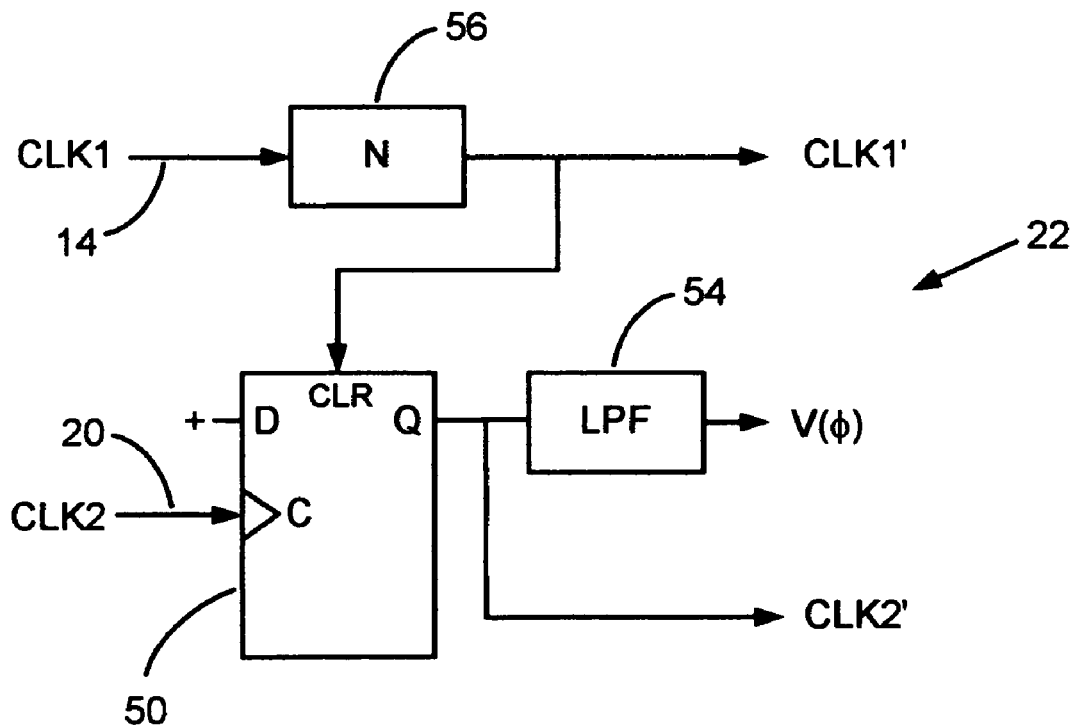
FIG. 3b is a diagram of a phase detector for harmonically related clocks.

FIG. 3b depicts a further example of a phase detector wherein the CLK1 signal is frequency divided by an integer N in counter 56, such that $V(\phi)$ is proportional to the phase between a sub-multiple of the CLK1 frequency and the direct frequency of CLK2. Counter 56 output is CLK1' at a sub-multiple N of CLK1. When the CLK1' is at a logic 1, latch 50 remains cleared, and when CLK1' is at logic 0, the next trigger edge of CLK2 sets Q high. Since CLK2 occurs at a higher rate than CLK1', the Q output, which is also CLK2', ranges over less than 2 π. For N=4, the phase range is ¼ π, a desirable range for many ranging systems. Further details on this harmonic mode can be found in U.S. Pat. No. 6,072,427, "precision Radar Timebase Using Harmonically Related oscillators," by Thomas E. McEwan, the applicant of the present invention. Two frequencies are harmonically related if one is a multiple of the other, or dose to a multiple of the other, i.e., offset by a small difference frequency from the harmonic frequency.

Figure 4:
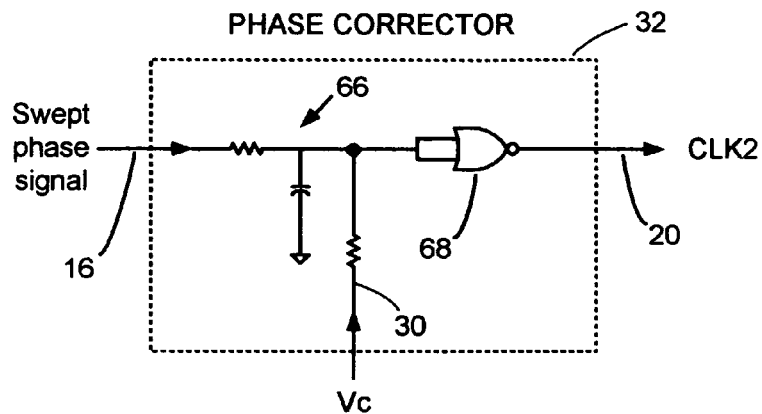
FIG. 4 is a diagram of a phase corrector.

FIG. 4 is an exemplary phase corrector 32 that includes an RC network 66 coupled to a threshold element 68, a logic gate. RC network 66 slows the swept phase signal risetime and voltage Vc on line 30 provides an offset voltage that is applied to the input of gate 68. The exact time that gate 68 thresholds on its input is a function of its input offset voltage. Therefore the timing, i.e. the phase, of the swept phase CLK2 signal on line 20 is controlled by Vc.

Figure 5:
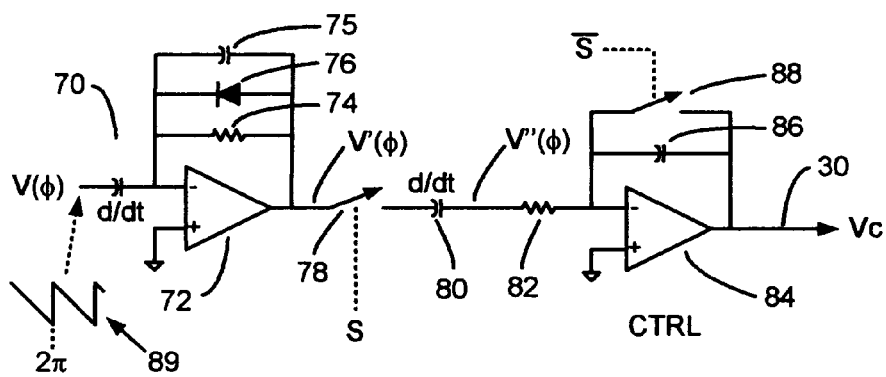
FIG. 5 is a diagram of a derivative circuit and a controller.

FIG. 5 is an exemplary implementation of differentiators 24, 26 and controller 28, as shown in FIG. 1. Phase detector 22 output $V(\phi)$ is applied to differentiation capacitor 70, also labeled d/dt, which is coupled to the input of a transimpedance amplifier that includes op amp 72 and feedback resistor 74, forming, in combination with capacitor 70, a classic differentiator. Diode 76 conducts during the phase wrap transition at the 2 π points, i.e., during the positive edges seen in V(φ) waveform 89, and acts to speed settling to the next negative going ramp of V(φ). Op amp 72 outputs a substantially constant voltage V'(φ) proportional to the rate of change of V(φ).

Switch 78 is normally closed and couples V'(φ) to a second differentiation capacitor 80, also labeled d/dt. Capacitor 80 differentiates V'(φ) and couples a derivative voltage V"(φ) to resistor 82 and op amp 84. Capacitor 80 forms an AC coupled circuit. Voltage V"(φ) is an error signal representing deviations from a perfectly linear sweep. Op amp 84 is a control amplifier that greatly amplifies the error signal to provide a feedback control voltage Vc on line 30 to phase corrector 32. Capacitors 75, 86 define the control loop bandwidth. Capacitor 80 need not necessarily form a perfect differentiator; it functions to block the DC voltage level of V'(φ).

Switch 78 is opened by a pulse applied to the dashed S control line of FIG. 5 shortly before the phase wrap. Opening switch 78 blocks phase wrap glitches from coupling to the control op amp. Switch 78 closes shortly after the phase wrap. The S control pulse can be derived from V(φ). Phase wrap glitches can limit the timing accuracy. Switch 88 is normally open and can close in compliment to switch 78. The closure of switch 88 resets the output of op amp 84 at the phase wrap point and then switch 88 opens to allow extremely large DC gain, which helps reduce phase errors. Exemplary op amps 72, 84 are Texas Instruments, Inc. TLV274 and switches 78, 88 are Motorola, Inc. CMOS analog switches 74HC4066.

Figure 6A:
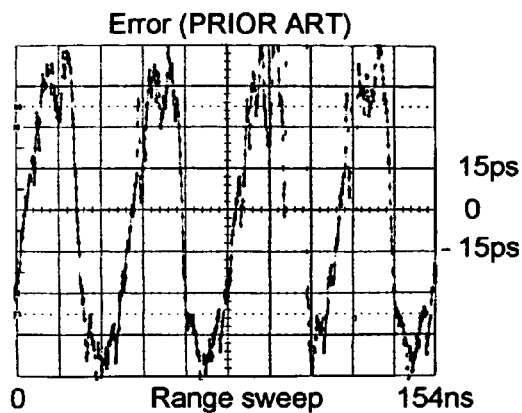
FIG. 6a is an error plot for a timing system without error correction (PRIOR ART).

FIG. 6a (PRIOR ART) plots phase error between CLK1' and CLK2' for an actual timing system using harmonically related clocks and the phase comparator of FIG. 3b. A DDS clock generator as depicted in FIG. 2c is used. Errors are indicated as the temporal equivalent of 15 picoseconds per division across a sweep range of 154 ns. CLK1' is operated at 1.625 MHz and CLK2 at 6.5 MHz in a harmonic system as described with reference to FIG. 3b. Hence the sweep range is 1/6.5 MHz=154 ns, which corresponds to a phase range of ¼ π. Maximum errors are on the order of +/−60 picoseconds, or about +/−0.04% of full scale range.

Figure 6B:
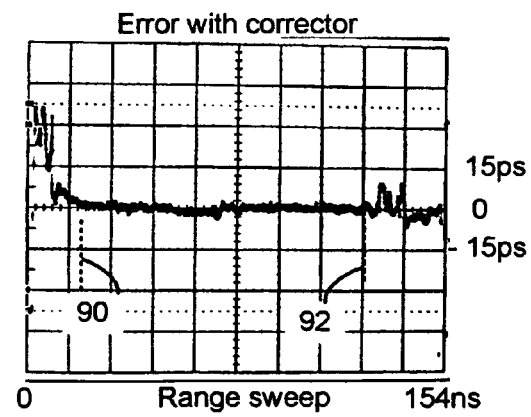
FIG. 6b is an error plot for a timing system with error correction.

FIG. 6b is a plot of the phase error for the system of FIG. 6a further including an exemplary error corrector as illustrated by the timing system 10 of FIG. 1. Range marker 90 can correspond to zero range and range marker 92 can correspond to the maximum range for a rangefinder implementation. Errors between markers 90, 92 are on the order of 1-picosecond, or less than 0.001% of full scale range.

Figure 7:
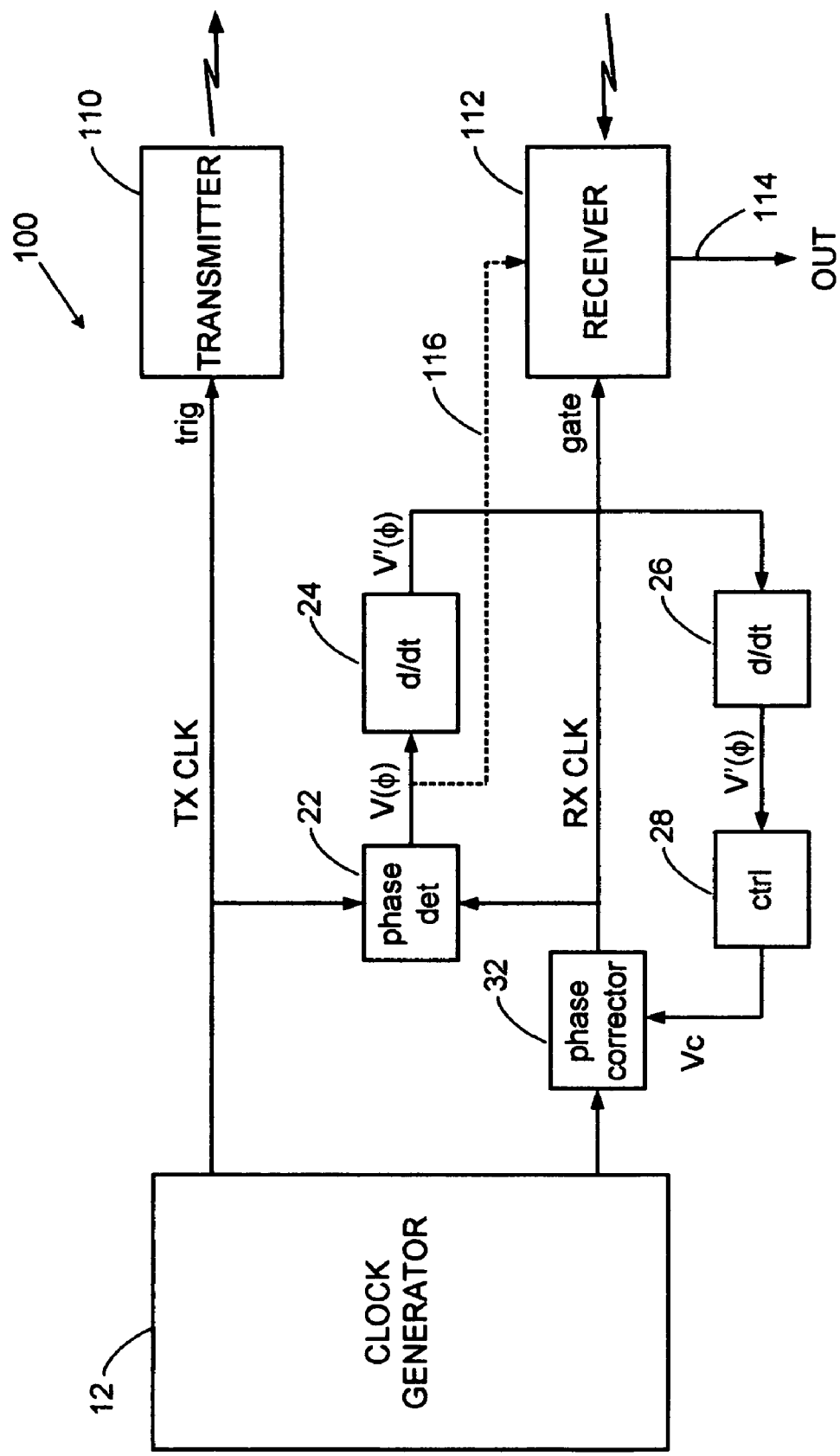
FIG. 7 is a diagram of the present invention in a ranging system.

FIG. 7 illustrates an exemplary pulse-echo rangefinder 100 incorporating timing error corrector 10, as shown in FIG. 1, of the present invention. Clock generator 12 couples a transmit clock signal TX CLK to transmitter 110 and, via phase corrector 32, a receive clock signal RX CLK to receiver 112. TX CLK triggers transmit pulses and transmitter 110 radiates corresponding radio or optical transmit pulses. Alternatively, transmitter 110 transmits electrical pulses along a conductor in a time domain reflectometer. Receiver 112 receives echo pulses produced by the transmitter. RX CLK gates the receiver, causing it to sample echoes at the instant of gating. Samples are output from the receiver on line 114 in expanded time as the phase of RX CLK slips relative to TX CLK. The samples on line 114 may occur on a pulse-by-pulse basis, one for each pulse of RX CLK, or the samples may be integrated to form an integrated output representing many RX CLK cycles. Receiver 112 can include processing, in which case the output on line 114 represents a processed output arising from samples taken at timing instants defined by RX CLK.

Phase ramp voltage V(φ) can be optionally coupled to receiver 114 via line 116 to control a variable gain amplifier to compensate echo versus range loss. Other uses for phase ramp voltage V(φ) include detecting the phase wraps at 2 π for generating reset pulses, generating switch control pulses for controller 28, or for providing an analog indication of range. Blocks 22, 24, 26, 28 and 32 form a timing error corrector, which provides precision timing for rangefinder system 100. Transmitter 110 and receiver 112 may be fashioned to operate with a single radiator or lens, or in the case of TDR, may be coupled onto a single conductor, as known in the art.

Figure 8:
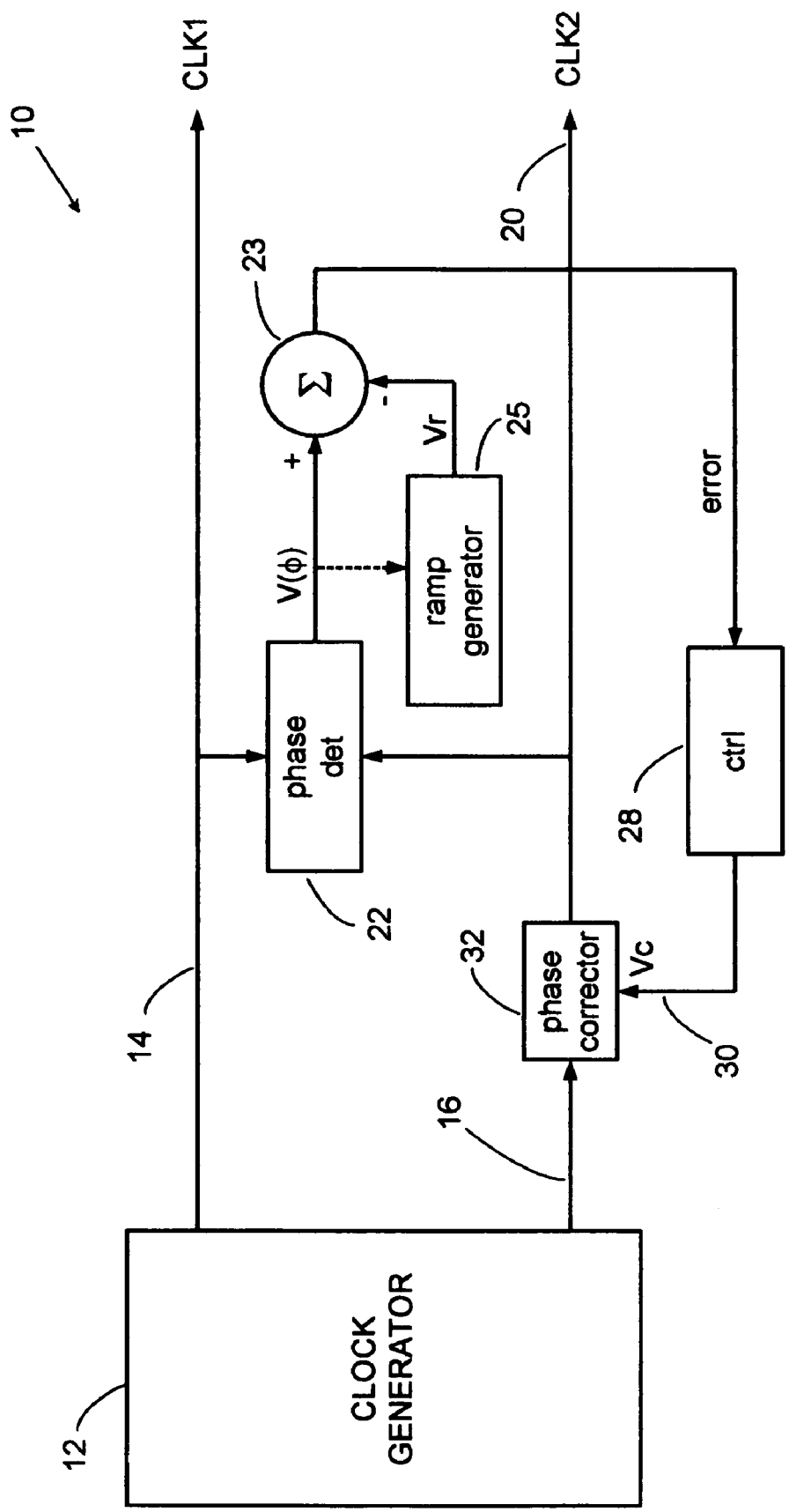
FIG. 8 is a diagram of an error-corrected swept phase timing system including an alternative error detector.

FIG. 8 illustrates another exemplary approach to obtaining an error signal for error correction. Clock generator 12, phase detector 22, control 28, phase corrector 32, CLK1 and CLK2 are as described previously. Reference ramp generator 25 generates a voltage ramp that matches phase ramp V(φ). Reference ramp generator 25 can consist of an analog generator or a digital generator as can be provided by a counter and a digital-to-analog converter (DAC). The optional dashed line in FIG. 8 connecting phase detector 22 to reference ramp generator 25 can provide synchronization between the phase ramp V(φ) and reference ramp voltage Vr, so they both reset simultaneously. This connection may also provide amplitude regulation so both V(φ) and Vr match in peak-to-peak amplitude. Differencing element 23 subtracts Vr from V(φ) and outputs a difference voltage, i.e., an error signal to control 28. Control 28 amplifies the error signal to produce a control voltage Vc at the phase control port of phase corrector 32, which corrects sweep phase errors. Control 28 can be AC coupled to strip off any DC offset in the error signal and to control only the deviations.

Phase detector 22, ramp generator 25 and differencing element 23 form an error detector. Similarly, referring to FIG. 1, phase detector 22, first differentiator 24 and second differentiator 26 form an error detector.

The use of the word "radar" herein refers to traditional electromagnetic radar that employs microwaves or millimeter waves, and it also refers to optical radar, i.e., laser rangefinders, as well as guided wave radar, wherein radar pulses are guided along a electromagnetic guide wire or other conductor, as in TDR. "Radar" includes monostatic and bistatic systems, as well as radars having a single antenna/transducer. The use of the phrase "offset frequency" generally refers to an offset frequency between 1 and 1000 Hz between transmit and receive clock signals. However, the scope of the invention also encompasses larger offsets as may be required in various applications. Changes and modifications in the specifically described embodiments, including changing to digital and software embodiments, can be carried out without departing from the scope of the invention which is intended to be limited only by the scope of the appended claims.

What is claimed is:

1. An error-corrected swept phase timing system, comprising:
    a clock generator for providing a first clock signal and a swept phase signal,
    a phase corrector including a control port for producing a second clock signal in response to the swept phase signal,
    an error detector for producing an error signal proportional to phase error between the first and second clock signals; and
    a controller coupled to the control port for producing a control signal proportional to the error signal.

2. The system of claim 1 wherein the error detector comprises a phase detector for producing a phase signal proportional to phase between the first and second clock signals, a first differentiator for producing a derivative signal from the phase signal and a second differentiator for producing an error signal from the derivative signal.

3. The system of claim 2 wherein the error detector comprises a phase detector for producing a phase signal proportional to phase between the first and second clock signals, a reference ramp generator for producing a reference ramp signal and a differencing element for producing an error signal proportional to the difference between the reference ramp signal and the phase signal.

4. A radar, laser or TDR ranging system comprising:
   a clock generator for producing a transmit clock signal and a swept phase signal,
   a transmitter triggered by the transmit clock signal for producing a transmitted signal,
   a phase corrector including a control port for correcting the phase of the swept phase signal and for producing a receive clock signal,
   a receiver gated by the receive clock signal for producing detected echoes of the transmitted signal,
   an error detector for producing an error signal proportional to phase error between the transmit clock signal and the receive clock signal; and
   a controller coupled to the control port for producing a control signal proportional to the error signal to correct phase error between the transmit and receive clock signals.

5. The system of claim 4 wherein the error detector comprises a phase detector for producing a phase signal proportional to phase between the transmit and receive clock signals, a first differentiator for producing a derivative signal from the phase signal and a second differentiator for producing an error signal from the derivative signal.

6. The system of claim 4 wherein the error detector comprises a phase detector for producing a phase signal proportional to phase between the transmit and receive clock signals, a reference ramp generator for producing a reference ramp signal and a differencing element for producing an error signal proportional to the difference between the reference ramp signal and the phase signal.

7. A method for generating error-corrected swept phase timing signals in time expanded radar systems, comprising:
   generating a first dock signal,
   generating a swept phase signal,
   correcting the phase of the swept phase signal in response to a control signal to produce a second clock signal,
   detecting phase errors between the first and second clock signals to produce an error signal; and
   producing a control signal responsive to the error signal for correcting the phase of the swept phase signal.

8. The method of claim 7 wherein detecting phase errors between the first and second clock signals further comprises detecting phase between the first and second clock signals to produce a phase signal, differentiating the phase signal to produce a derivative signal, and differentiating the derivative signal.

9. The method of claim 7 wherein detecting phase errors between the first and second clock signals further comprises detecting phase between the first and second clock signals to produce a phase signal, producing a reference voltage ramp and differencing the phase signal and the reference ramp.

\* \* \* \* \*